United States Patent Office.

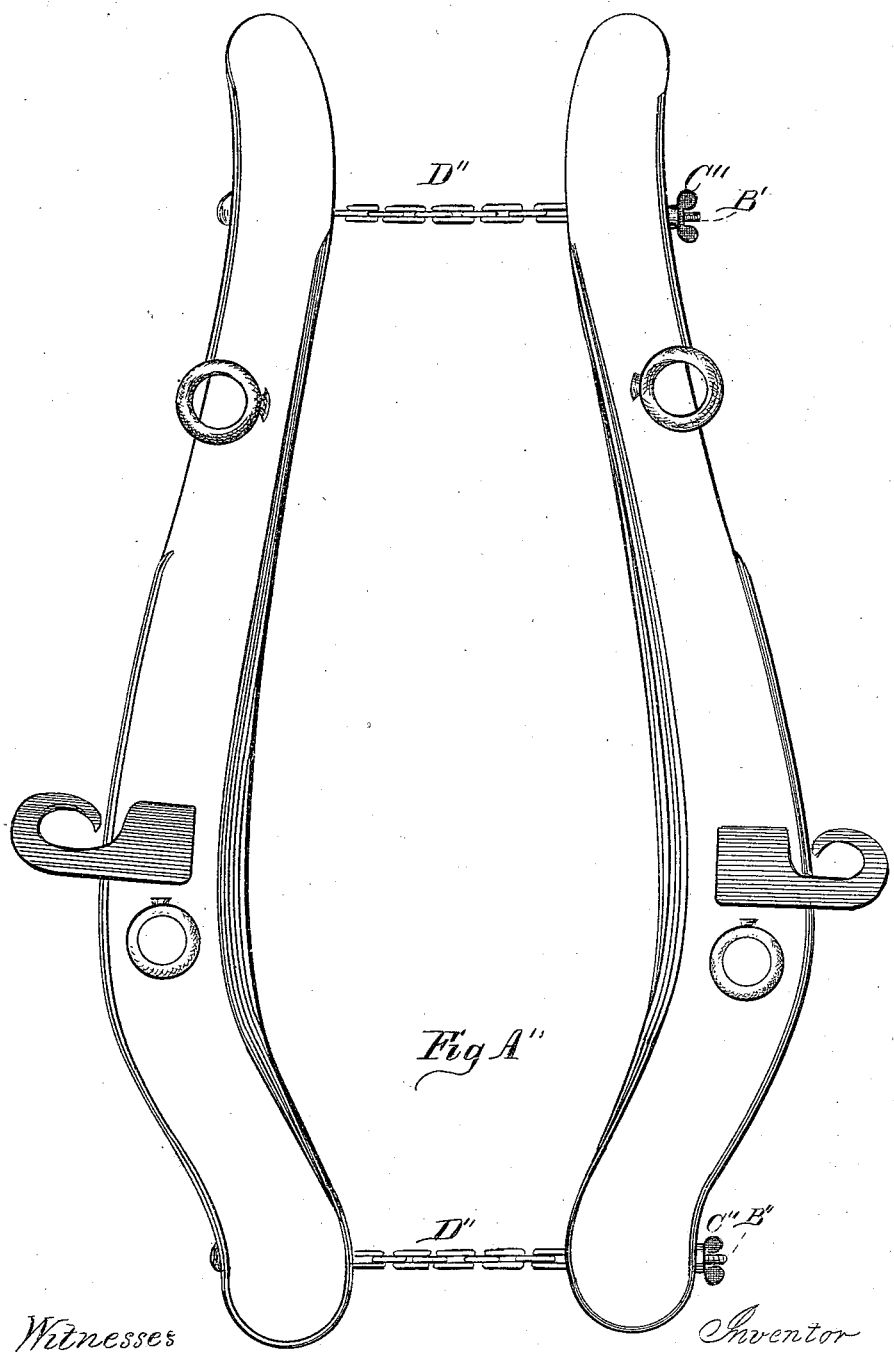

J. T. McDIVITT, OF FAYETTEVILLE, OHIO.

Letters Patent No. 94,230, dated August 31, 1869.

IMPROVED HAMES-FASTENER.

The Schedule referred to in these Letters Patent and making part of the same.

To all whom it may concern:

Be it known that I, J. T. McDIVITT, of Fayetteville, in the county of Brown, and the State of Ohio, have invented a new and improved Mode of Fastening Hames; and I do declare that the following is a full and exact description of the same.

The nature of my invention consists in fastening all kinds of hames, as follows:

An eyed staple, made of iron, to pass through the left hame, at the top and bottom, at the usual place of fastening hames, the eye of said staple to be on the inside of the hame. (See figure marked A", and made a part of these specifications.) From said eye of said staple a small chain leads to the right hame, (see said figure A",) said right hame to be provided with a small movable hook, said hook to pass through said right hame at the usual place of fastening hames, the hooked end of said hook to be on the inside of said hame, (see figure A",) the chain of the left hame, as above-described, to catch on said hook, passing through said right hame at any link desired, said hook, as above described, to be provided with a hand-nut, (see figures A" and B" of drawings,) said hand-nut to work on the outside of said right hame by means of which said hook can be tightened up to hold said chain in its place.

What I claim as new in hames-fastenings, and desire to secure by Letters Patent, is—

The threaded hook B" and screw-nut C", in combination with a chain D" attached to the ends of hames, substantially as shown and described, and for the purposes set forth.

J. T. McDIVITT.

Witnesses:
C. J. VAN ANDA,
PAT. SAVAGE.